July 10, 1962  C. C. WAUGH ET AL  3,043,141
MASS FLOW METER
Filed July 28, 1958  4 Sheets-Sheet 1

INVENTORS
CHARLES C. WAUGH
KENNETH R. JACKSON
BY

ATTORNEY

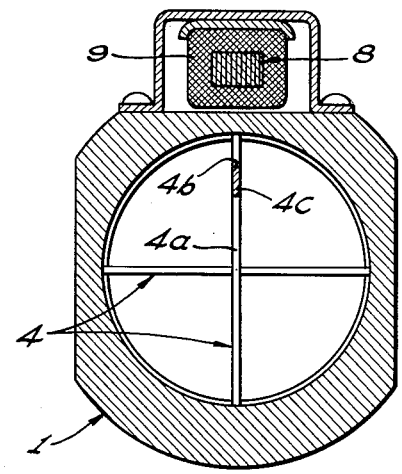
FIG. 4.
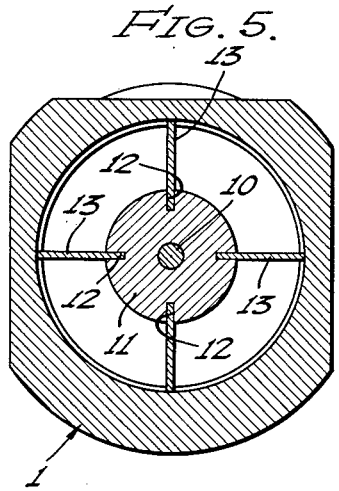
FIG. 5.
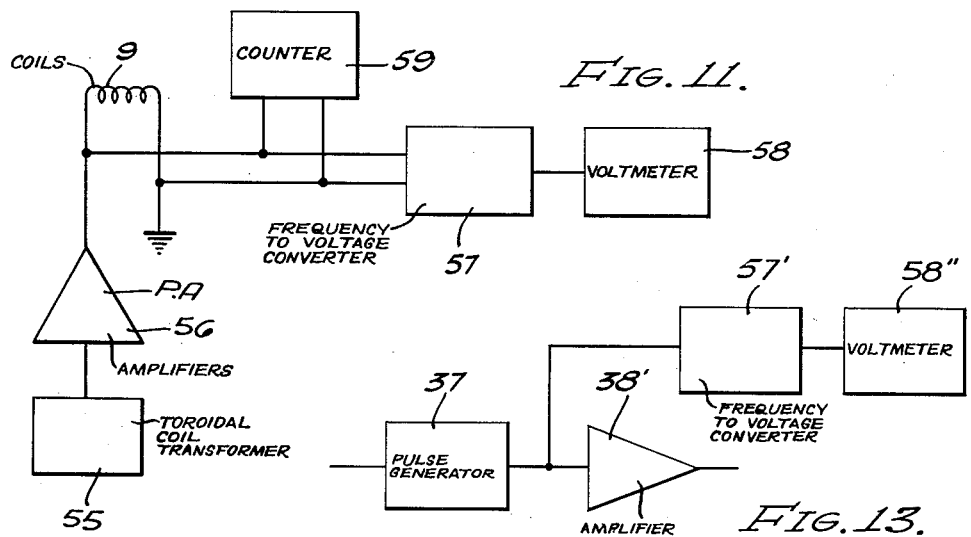
FIG. 11.
FIG. 13.
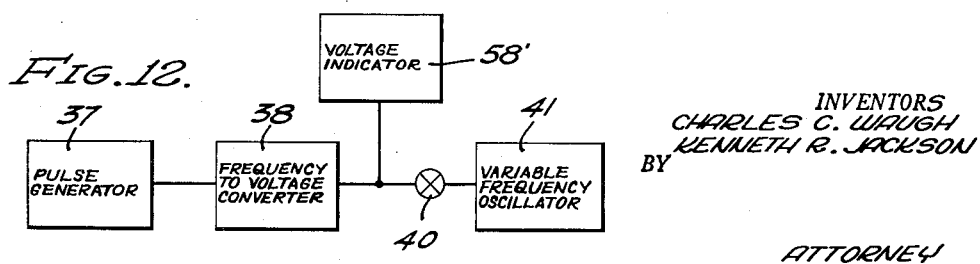
FIG. 12.
INVENTORS
CHARLES C. WAUGH
KENNETH R. JACKSON
BY
ATTORNEY

INVENTORS
CHARLES C. WAUGH
KENNETH R. JACKSON
BY

ATTORNEY

United States Patent Office 3,043,141
Patented July 10, 1962

3,043,141
MASS FLOW METER
Charles C. Waugh, Tarzana, and Kenneth R. Jackson, Los Angeles, Calif., assignors, by mesne assignments, to The Foxboro Company, a corporation of Massachusetts
Filed July 28, 1958, Ser. No. 751,511
22 Claims. (Cl. 73—194)

This invention relates to a mass flow meter which reports the mass rate of flow, or the total mass flow, of fluids, either liquid or gas or a combination of liquid and gas. The mass flow meter of our invention is formed of a transducer element composed of a means to impart an angular velocity to the fluid fed to the meter by converting part of the kinetic energy of linear flow into rotational kinetic energy, and provides means to sense the angular velocity of the fluid thus produced. Means are provided whereby the magnitude of the resultant torque generated by the fluid, and, if desired, the magnitude of the angular velocity may be determined.

In such flow meters the mass flow rate is proportional to the ratio of the torque generated to the angular velocity of the rotating fluid.

In the meters of our invention, we may regulate the magnitude of the torque to maintain the angular velocity of the fluid constant, irrespective of the variations in mass flow and measure the torque amplitude by means of a transducer which senses the magnitude of the torque required to maintain rotation of the fluid constant irrespective of the mass flow. The magnitude of this torque is a valve which is proportional to the mass flow.

Alternatively, we may, by means of a torque sensing transducer, sense the torque generated at any mass rate of flow and also sense the angular rotation of the fluid which causes this torque and by computation or by means of an automatic computer, obtain a value of the ratio of these values and thus a value which is proportional to the mass flow.

In all of these cases we may, by means of an integrating means, obtain the total mass flow in any given period of time.

In the co-pending application, Serial No. 737,816, filed May 26, 1958, one of us has described a mass flow meter in which the fluid is given a constant angular velocity by an applied variable torque, controlled to maintain angular velocity to the fluid constant. Additional control means are provided in the form of a servo feed back loop which includes the torque applying means and also means which serve to control the torque applying means responsive to variations in such angular velocity. Means are also provided to sense the magnitude of the torque. The ratio of the torque to the angular velocity is proportional to the mass flow, and the instrument may therefore be calibrated to report the mass flow by reporting a signal which is responsive to the magnitude of the torque applied to maintain a chosen constant angular velocity of the fluid.

It is one of the improvements of our present invention to employ a hysteresis brake, which applies a variable torque responsive to transient variations in the angular velocity of the fluid resulting from variations in the rate of flow, to null out said transients and to maintain said angular velocity constant irrespective of said variations in rate of flow.

The specific means of the preferred embodiment of our invention whereby such rotational energy is imparted to the fluid is a freely rotating turbine wheel whose blades are so designed that the turbine wheel is turned by the axial flow of the fluid entering the wheel, and thus the fluid exiting from the wheel is given an angular rotation at a rate which is proportional to the axial flow velocity of the fluid entering the turbine wheel. A sensing element is provided on the downstream side of the turbine wheel to sense the angular velocity of the fluid. As stated previously, a hysteresis brake is mechanically connected to the turbine wheel.

In order to generate the braking torque, we apply a magnetic flux density to the hysteresis brake armature by applying the required D.C. current to the field coil of the brake. This creates a drag torque which will control the rate of rotation of the turbine wheel. We may provide a means for sensing the magnitude of said torque, and means to sense the angular velocity of rotation of the fluid, and means to obtain values which are related to the torque and said angular velocity.

In our preferred embodiment we sense the angular velocity of the fluid by means of a rotor which is turned by the fluid leaving the turbine wheel. The rotor is preferably composed of a plurality of circumferentially spaced blades to which a turning torque is applied by the fluid flowing from the turbine wheel as a result of its angular velocity. The rotor is thus caused to rotate at a rate corresponding to the angular velocity of the fluid exiting from the turbine wheel.

In our preferred embodiment we sense the rate of rotation of the rotor by means of an inductive pick-off in which the flux density of a magnetic circuit which is inductively coupled with a field coil, varies as the blades of the rotor pass by the core of the pick-off. This results in a periodic flux density change at a rate equal to the rate at which the blades pass the pick-off, and, therefore, a voltage is generated at the terminals of the coil at a frequency which is proportional to the rate of rotation of the rotor blades.

In our preferred embodiment the turbine wheel is a freely rotating hub carrying helical blades circumferentially spaced about the hub of the impeller, while the sensing rotor is formed with flat blades whose planes are radially positioned with respect to the axis of rotation of the rotor and circumferentially spaced about said axis.

The control and information circuits for this transducer include means cooperating with the inductive pick-off to generate a voltage pulse at a rate corresponding to the rate of rotation of the rotor. The voltage pulses are converted into a square wave pulse at a pulse rate responsive to the pulse rate generated by the inductive pick-off. The square wave pulses are shaped in a pulse wave shaper to give pulses of constant amplitude and width, and at the pulse rate generated at the inductive pick-off. This shaped pulse is hereinafter referred to as "standard pulse." The "standard pulse" is amplified to a degree required to saturate the armature of the hysteresis brake so that the average drag torque produced is proportional to the pulse rate.

In order to adjust the drag torque so that it will produce a constant rate of rotation of the fluid, and therefore a constant frequency voltage at the inductive pick-off, the "standard pulse" rate applied to the hysteresis brake is adjusted to correspond to the difference between the pulse rate generated at the inductive pick-off and an arbitrary fixed rate at which it is desired that the impeller rotate, as chosen on the calibration of the transducer. This difference will thus constitute an error signal proportional to the deviation of the angular velocity of the fluid from the chosen calibrated angular velocity.

In a second embodiment, the pulse rate of the "standard pulse" applied to the hysteresis brake is inversely proportional to the integral of the difference between the pulse rate generated at the inductive pick-off and the chosen pulse rate and, thus, as the pulse rate at the inductive pick-off rises above the chosen pulse rate, a lesser drag torque is applied to the turbine wheel, and as the pulse rate of the inductive pick-off falls below the chosen pulse rate, a greater drag torque is applied. The drag torque variation is thus inversely proportional to the integral of the pulse rate deviation, i.e., to the magnitude of the error signal. Thus, a servo loop is created which adjusts the rate of rotation of the fluid to be constant at the chosen angular velocity by adjusting the torque to a value to maintain angular velocity of the fluid as measured by the radial blade rotor pulse generator constant irrespective of variations of the flow of the fluid.

Since the servo loop described above maintains the rate of rotation of the rotor constant, a determination of the pulse rate applied to the hysteresis brake will report the mass flow rate, and by obtaining the time integral of these pulses, we can obtain the total pulse count in such period and, therefore, the total mass flow in such period.

These, and other objects of our invention, will be more fully described in connection with the drawings of which:

FIG. 4 is a section taken on line 4—4 of FIG. 1;

FIG. 5 is a section taken on line 5—5 of FIG. 1;

FIG. 11 is a schematic diagram of a pulse counting circuit connected to the hysteresis brake;

FIG. 12 is a diagram useful with the circuit of FIG. 9 showing means for obtaining informaion relating to the angular velocity of the fluid; and FIG. 13 is a diagram useful in connection with the circuit of FIG. 10 to obtain information relating to the angular velocity of the fluid.

Figure 1:
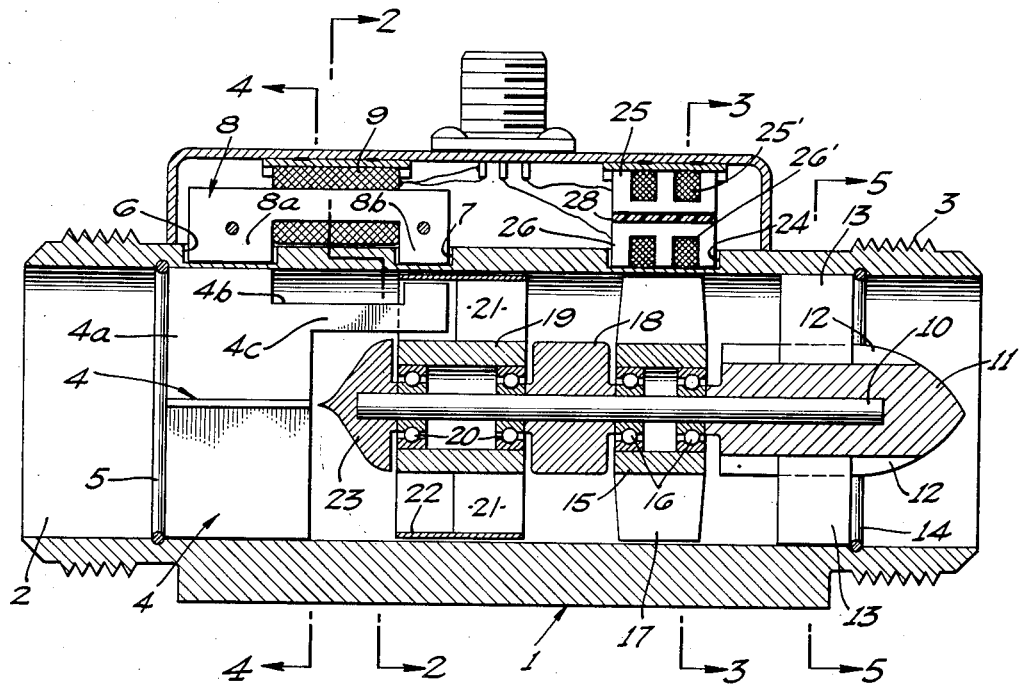
FIG. 1 is a vertical section taken through the mass flow meter transducer element.
Figure 2:
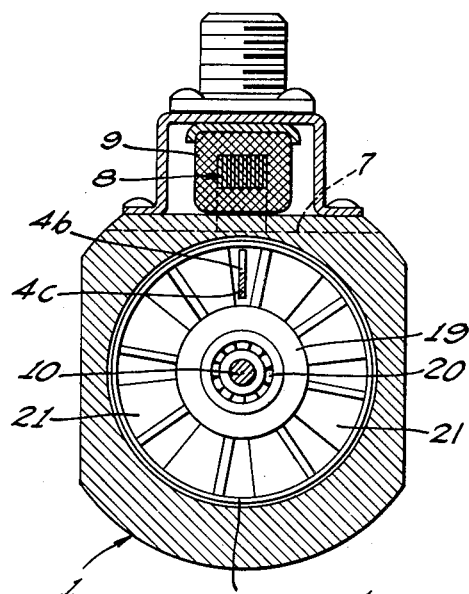
FIG. 2 is a section taken on line 2—2 of FIG. 1.
Figure 3:
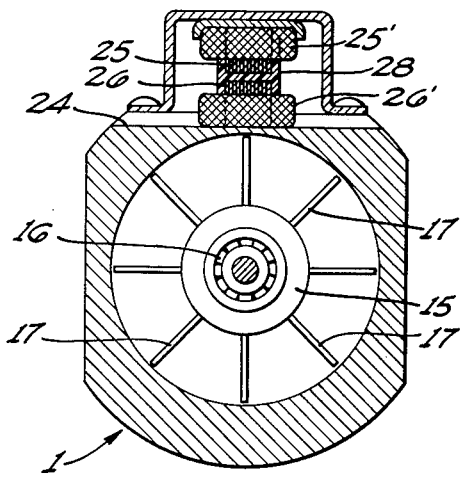
FIG. 3 is a section taken on line 3—3 of FIG. 1.

Referring to FIG. 1, positioned within the tubular case 1 is a set of flow straightening vanes 4. The straightening vanes 4 are positioned at the entrance end 2 of the tubular case 1. The vanes 4 are composed of four mutually perpendicular plates (see FIG. 4) positioned in cruiciform form at the entrance 2 of the tubular case 1. One of the vanes, marked 4a, has an extension 4c in which is positioned a notch 4b to form a hook shaped section marked at 4c (see FIG. 1). The plates 4 are frictionally positioned inside the case and retained by a snap ring 5. The case 1 is squared off at the top and is notched with rectangular notches at 6 and at 7, into which is placed a laminated iron core 8 which is C-shaped, the legs 8a and 8b of the C's fitting into the notches 6 and 7. The laminated core 8 is inductively coupled with a coil 9 to form an electro-magnet for purposes to be later described. The ends 8b and 4c form the pole pieces of the magnetic circuit.

The shaft 10 axially positioned in the case 1 has mounted at one end the nosepiece 11, which is egg-shaped and points downstream in the case. The nosepiece 11 is notched with a series of slots 12 positioned circumferentially of the nosepiece 11, in which slots are positioned four mutually perpendicular plates 13 in cruciform orientation to support said shaft (see FIG. 5). Mounted upon the shaft 10, on bearing 20, is the freely rotating hub 19 carrying helically shaped blades 21. Mounted between the hubs 15 and 19 is a separator 18 rigidly connected to the shaft 10. Mounted adjacent the separator 18 is a hub 15 mounted on bearings 16 to rotate freely on said bearings. Positioned in the hub 15 are a plurality of radial blades 17 of planar form mounted parallel to the axis of the tubular case 1 and positioned circumferentially of the hub 15 with the axis co-planar with each of the blades. Positioned at the end of the shaft 10 and adjacent the straightening vanes 4 is the streamlined cap 23.

The shroud ring 22 is positioned at the ends of the blades 21 and between the hook-shaped end 4c and the inner wall of the tube 1 adjacent the notch 7, and is thus mounted to rotate to pass between the pole pieces 8b and 4c, the magnetic circuit being completed through the air gap and the thin section of the wall of 1 at the notches 6 and 7.

Figure 6:
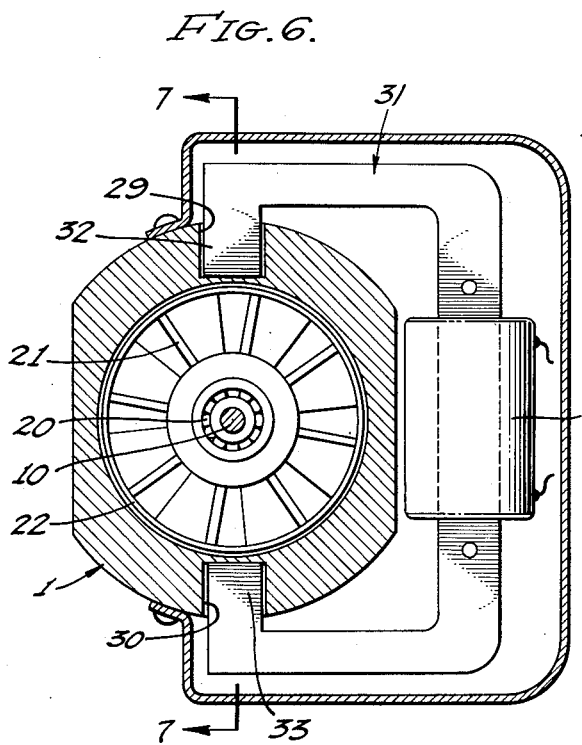
FIG. 6 shows another form of the magnetic circuit for the hysteresis brake.
Figure 7:
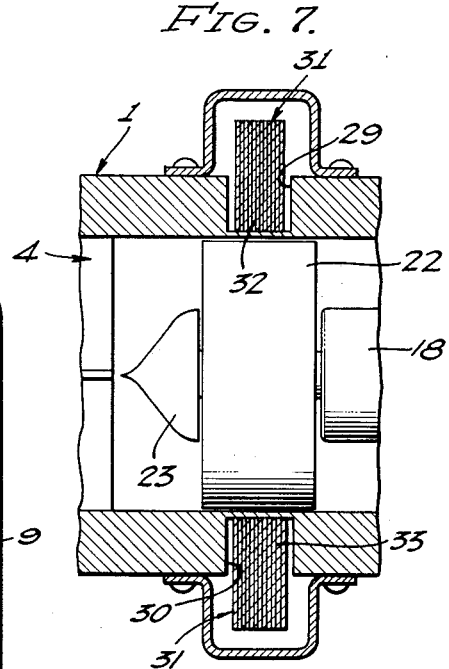
FIG. 7 is a section taken on line 7—7 of FIG. 6.

A notch 24 is positioned in the squared off top of the case 1 opposite the ends of the radial blade 17. Positioned in the notch 24 are back-to-back E-shaped cores 25 and 26, separated by insulating separator 28. The center leg of each of the E-shaped cores is wound with a coil 25' and 26'. FIGS. 6 and 7 show a variation of the positioning of the electromagnet of the hysteresis brake. As shown, the ends 32 and 33 of the C-shaped magnet core 31 (coupled to field core 9) are positioned in two diametrically opposed notches 29 and 30 adjacent the shroud ring 22. The armature thus is mounted for rotation to pass between the pole pieces 32 and 33. In all other respects the form of FIGS. 6 and 7 is the same as in FIGS. 1–5.

A suitable housing may be provided as is shown in FIGS. 1, 2, 6 and 7.

The flow meter case 1 may be made of aluminum or other non-magnetic materials such as non-magnetic stainless steel. This is also true of all other portions of the flow meter as indicated above except as follows:

The cores of the electromagnets 25 and 26 and 8 and 31 are made of laminated iron such as is used in electromagnet cores or transformers, and blade 4a is of metal having high magnetic permeability. The rotor shroud 22 is made of a permanent magnet material such as is usually employed in hysteresis motors or clutches. Such material may be known permanent magnet materials commercially available, for example, "Vicalloy" is believed to be composed of about 38% iron, about 10% vanadium, and 52% cobalt. "Alnico 5" is believed to be composed of about 8% aluminum, 15% nickel, 24% cobalt, 3% copper and the rest iron. The blades 17 are made of material of high magnetic permeability. The hubs, bearings, shafts, straightening vanes, other than 4a, nosepieces, and other portions of the structure are made of non-magnetic material such as stainless steel. By the term non-magnetic, we wish to be understood that the material has a relatively low magnetic permeability so that it will not affect the magnetic characteristics of the shroud ring 22 of the hysteresis brake, nor of the action of the inductive pick-offs 25 and 26 on the blade 17.

The operation of the device is as follows:

The incoming fluid entering through inlet 2 passes by the vanes 4 and 4a, and any inherent rotational energy in the incoming fluid is removed and the fluid exiting from the vanes has substantially entirely a linear velocity with substantially no rotation. In passing by the blades 21 of the turbine wheel (referred to herein as the first rotor), due to their helical conformation, a rotation is imparted to the vanes 21 and the fluid. Part of the kinetic energy of the axial flow of the fluid is therefore converted into rotational kinetic energy. The fluid exiting from the blades 21 will therefore have an angular velocity dependent on the braking torque applied to the blades 21. As the rotating fluid passes through the blades 17, which blades are positioned in the hub 15, radially of the axis of the shaft 10, which is axially positioned in the passageway 1, the blades 17 will be rotated by the fluid at substantially the angular velocity of the fluid entering the blades 17, the frictional drag of the bearings being held down to a minimum. The radial blade rotor is hereinafter referred to as the second rotor. Downstream bullet-shaped member 11 will prevent any violet changes in the fluid flow pattern immediately leaving the second rotor blade 17.

The fins 13 on the downstream side are used to position the nose 11 and will also be of assistance in the action of 11.

The hubs, spacer and the cap 23 and 11 are made of the same exterior diameter to limit the amount of turbulence in the chamber 1 passing by the elements of the torque motor.

The device described, together with the circuits, acts to control the angular velocity of the fluid to be substantially constant independent of the rate of mass flow by controlling the drag torque produced by the hysteresis brake to hold the angular velocity of the fluid exiting the blades 21 of the turbine substantially constant, irrespective of changes of mass flows, and provides for means for determining the magnitude of this torque. Therefore, since on calibration the angular velocity is chosen, and this angular velocity is maintained, the measurement of the torque will be a measure of the ratio of the torque to the angular velocity and, therefore, of the mass flow of the fluid.

Figure 8:
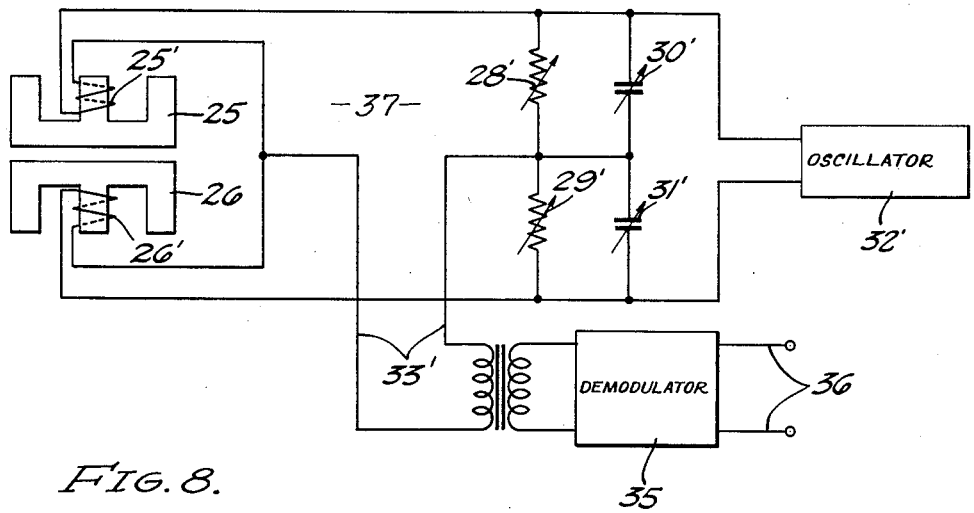
FIG. 8 is a schematic wiring diagram of the inductive pick-off bridge circuit.

The circuit 37 employed in connection with the transducer to produce the function described above, includes a pulse generator in the form of an inductive pick-off including the E-core laminations 25 and 26, illustrated schematically in FIG. 8. Two identical E cores, 25 and 26, made up of standard transformer iron laminations and mounted back-to-back as described above, have their coils 25' and 26' mounted on the center leg of each of the cores 25 and 26. The coils are connected in in electrical bridge circuit including the resistances 28' and 29' and the trim capacitors 30' and 31'. The bridge is fed by an oscillator 32' and the output of the bridge at 33' is inductively coupled with the demodulator 35 whose output is shown at 36.

When there is no flow through the unit, and the blades 17 are positioned remote from the core 26, the bridge is balanced by adjusting the resistances 28' and 29' and the capacitors 30' and 31' until the output at 33 is zero, with the oscillator 32' driving the bridge at a fixed frequency. Whenever the bridge is unbalanced, as when a blade 17 passes by the core 26 and the reluctance of the magnetic circuit is decreased, an output voltage will appear at 33' and at the output of the demodulator 36. The carrier frequency of the oscillator 32' is modulated by the frequency generated by the rotation of the blades, which is dependent upon the rate of rotation of blade 17 past the core 26.

The modulated frequency passes through a demodulator 35 inductively coupled with 33' to the output of the bridge, and the output 36 of the demodulator gives voltage pulses at the rate corresponding to the rate of rotation of the blade 17 with negligible reflected torque due to the magnetic circuit coupling between the inductive pick-off and the rotor blade 17.

The drag brake composed of the hysteresis brake shroud ring 22 and the electromagnet core 9 (FIG. 1) acts on the principle of a hysteresis brake. A D.C. current in the coil 9 establishes a magnetic flux density in the magnetic circuit which includes the rotor shroud ring 22. As the first rotor turns, the section of the shroud ring 22 positioned between the pole pieces of the core 8 and the member 4c becomes magnetized, and the section leaving these pole pieces returns to its initial magnetic state. Thus, the magnetic state of the shroud ring 22 is cycled through a magnetic hysteresis loop as the rotor moves between the pole pieces 4c and 8. A circumferential magnetic force on the rotor produces a torque which acts in a direction to stop the rotor motion. This torque is proportional to the magnetic flux density produced by coil 9 and is independent of the rotor velocity. By controlling the magnitude of the current in the coil 9, the torque can be controlled.

In our preferred embodiment we desire to maintain the current flow in coil 9 at a value to establish a substantially complete saturation of magnetic field in the shroud ring at the pole faces. In such case transient small variations in current amplitude will cause substantially no variation in the magnitude of the magnetic flux from the pole pieces through the contiguous portion of the shroud ring. However, as a practical matter the complete saturation of the shroud ring adjacent the pole pieces is difficult and, therefore, we prefer, as a safety measure, to hold the maximum value of the magnetizing current to give as complete saturation as practicable and to maintain the value of current substantially constant at such magnetizing value. By applying large amplitude current pulses to the coil, each of substantially like peak value, the magnetic material of the shroud ring will be substantially saturated and small variations in current amplitude will not produce substantial variations in magnetic flux. By controlling the amplitude, time period, i.e., the pulse width to be substantially constant, the time integral of the torque pulse will be substantially constant and the average value of the braking during any interval of time will be proportional to the pulse rate of the current pulses passing through 9 during such interval of time. By assuring that the pulse rate to 9 is controlled to maintain the pulse rate generated by the pulse generator described in connection with FIG. 8, at a constant frequency the pulse rate passing through coil 9 during any interval of time will therefore be proportional to the mass flow rate and the time integral of the pulse rate, i.e., total number of pulses for any period will be proportional to the total mass in such period.

Two forms of circuits are illustrated for obtaining these functions.

Figure 9:
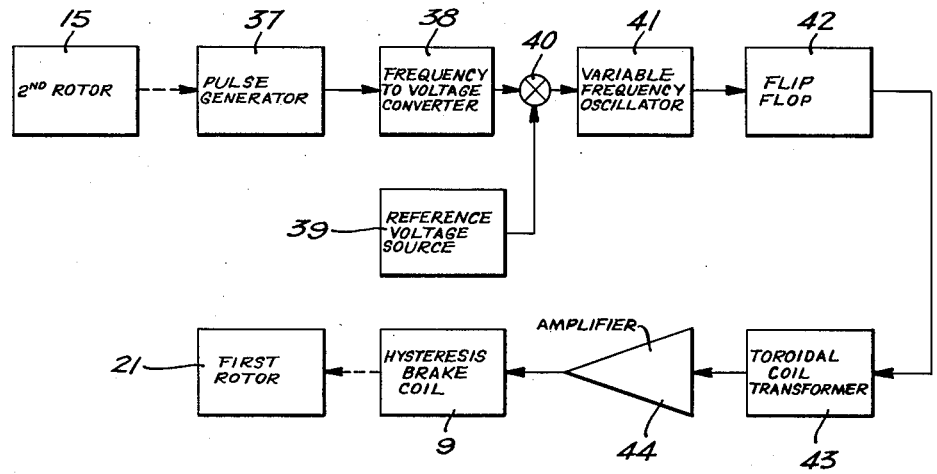
FIG. 9 is a schematic wiring diagram of one form of the control circuit for the hysteresis brake.

In FIG. 9 the pulse, at the rate $w$, generated at the inductive pick-off of the pulse generator shown at 37 in FIG. 9 (see FIG. 8) and appearing at the output 36 of the demodulator 35 of the pulse generator 37, is thus at a rate proportional to the fluid angular velocity of the fluid passing by blades 17. It is converted to a D.C. voltage proportional to the pulse rate by means of a standard frequency-to-voltage converter, such as a discriminator circuit, which gives an output voltage proportional to the frequency of the input voltage. The output from the frequency to voltage converter 38 is referenced to a chosen D.C. voltage source at 39 of constant voltage. The difference between the voltage at the output of the frequency voltage converter 38 and the standard reference voltage produced by 39, appears as an error voltage signal at the input 40 to the variable frequency oscillator 41. This D.C. voltage difference is, therefore, an error signal. The variable frequency oscillator 41 has a frequency which increases as the input error signal voltage generated at 40 increases. The output of the variable frequency oscillator triggers a flip-flop 42. The flip-flop 42 generates a square wave voltage which is applied to a pulse shaper such as a saturable toroidal core transformer 43. The output voltage from the transformer secondary consists of pulses having substantially constant amplitude and pulse width at a rate proportional to the error signal voltage at 40. This pulse is the "standard pulse" previously referred to. This "standard pulse" is amplified in the power amplifier 44 to produce current pulses of nearly constant amplitude and pulse width. These pulses are applied to the field core 9 of the hysteresis brake. The drag torque thus generated by each pulse of current in the field core of the hysteresis brake is substantially constant so that the average torque is proportional to the pulse rate.

The accuracy of this system depends upon the accuracy of the frequency-to-voltage converter 38 and upon having a very high gain in the variable frequency oscillator 41, i.e., the oscillator frequency should vary, for example, over a range of about 10 to 1 for a change in the control voltage, that is, the error voltage appearing at 40 corresponding to a change of about $\frac{1}{10}$ of 1% in the frequency of the pulses generated by the pulse generator 37.

Figure 10:
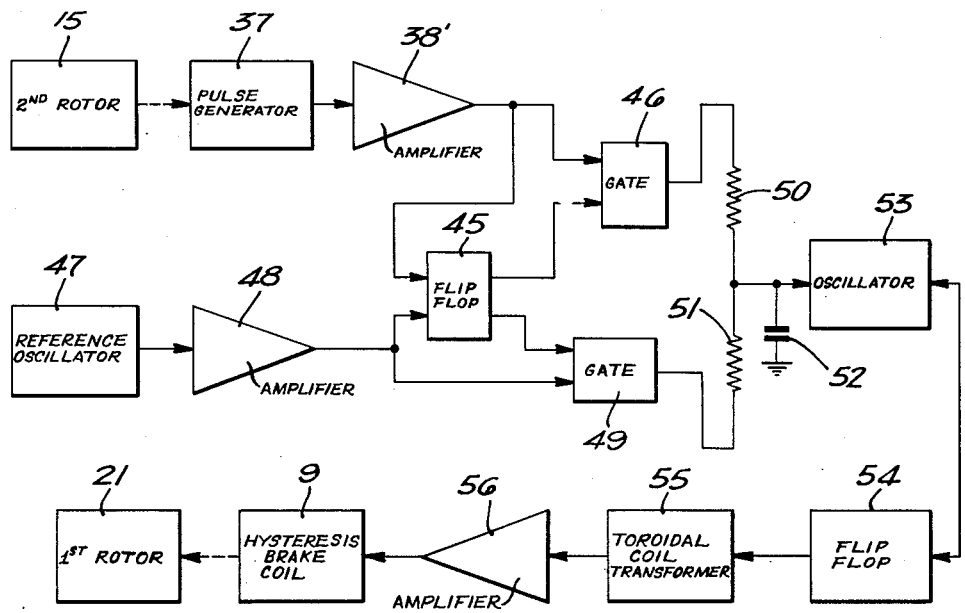
FIG. 10 is a schematic wiring diagram of another form of the control circuit for the hysteresis brake.

The second system illustrated in FIG. 10 which produces the functions also produced by the system of FIG.

9, incorporates an effective integration in the feed back to the servo loop, so that the frequency of the pulses applied to the hysteresis brake field coil will be varied until the speed of the second rotor blades 17 is at the correct rate which has been chosen in the calibration of the instrument.

The demodulated output at 36 from the pulse generator 37 is amplified in the amplifier 38'. The amplifier 38' is connected to one of the inputs of flip-flop 45 and an input to gate 46. The output from a reference frequency oscillator 47 operating at a fixed frequency is amplified at 48 and is connected to a second input of the flip-flop 45 and to input of a gate 49. One output terminal of the flip-flop 45 is connected to gate 46 and the other output of the flip-flop 45 is connected to gate 49. The output from gate 46 is connected through resistance 50 to the input of a variable frequency oscillator 53 similar to 41 of FIG. 9 and the output from gate 49 passes through a resistance 51 to the oscillator 53. The input of the oscillator is grounded through the capacitor 52. The output from 53 is connected through flip-flop 54, saturable toroidal core transformer 55, power amplifier 56 to the coil 9 of the hysteresis brake in the same manner as is described for FIG. 9.

The flip-flop 45 is a bistable state flip-flop with two inputs. Such devices are well known to those skilled in this art. A useful circuit of the form is illustrated on page 16 of "High Speed Computing Devices" by the Staff of Engineering Research Associates, 1950 ed., published by McGraw-Hill Book Co., N.Y.

The gates 46 and 49 are dual input gates such that when an input pulse from the charging amplifier 38' or 48 respectively approaches the gates, an output pulse passes from the gate only when a positive triggering voltage signal is passed to such gate by the flip-flop 45. Such gates are described at pages 37–41 of the above book.

The operation of the system shown in FIG. 10 is as follows: The output from the demodulator (see FIG. 8) is amplified at 38'. The reference oscillator generates a fixed frequency which is amplified at 48. The flip-flop 45 and gate 46 permit the passage of a train of pulses all of the same sign through resistance 50 and to the integrating capacitor 52. This system also permits the passage of a train of pulses all of the same sign through resistance 51 and to the integrating condenser 52. The sign of the pulses through 50 is opposite in sign to those through 51.

A pulse from amplifier 38', for example, a negative pulse, opens gate 46 and closes gate 49. Any succeeding pulses from 38' will pass through gate 46 and decrease the positive potential at the capacitor 52. Similarly, a pulse from amplifier 48, which in this case will be a positive pulse, passing from amplifier 48 will open gate 49 and close gate 46. Any succeeding pulses from 48 will pass through gate 49 and increase the positive potential on capacitor 52. Negative and positive pulses occurring alternately will switch gates 46 and 49 open and closed alternately but will not pass through to the capacitor 52. Thus, when the pulse rate from the second rotor (blades 17) is the same as the pulse rate from the reference frequency oscillator 48, which is chosen at calibration, the integrating condenser 52 will not receive pulses and no change in the control voltage at the variable frequency oscillator 54 will occur. No change will then occur in the pulse rate to the hysteresis brake, and no change will be effected in the braking torque applied to the first rotor (blades 21). Any deviation in speed of the second rotor (blades 17), and therefore of the pulses generated by the pulse generator 37, will cause a deviation in the pulse rate amplified at 38'. This will allow two or more consecutive pulses of the same sign to approach the condenser 52, and thus one or more of the pulses will be received by the condenser and thus the D.C. voltage of the integrating capacitor 52 will vary to control the variable frequency oscillator. The potential at the input to the oscillator 53 will therefore be the time integral of the difference in the rate at which pulses from 48 and 38' arrive at 52. The portion of the circuit composed of the variable frequency oscillator 53, the flip-flop 54, the saturable toroidal core transformer 55, power amplifier 56, and hysteresis brake coil 9 and the shroud ring 22 about the blades 21 of the first rotor are constructed and act in the same manner as the like components of the system shown in FIG. 9.

Since the system shown in FIG. 10 is a feed back system, it is not necessary that the control pulses from 48 passing to the gates to the variable frequency oscillator be exactly the same. The over-all system accuracy depends upon the accuracy of the reference frequency oscillator 47 and upon the constancy of the pulses to the hysteresis brake coil 9. The size of the control pulses from the oscillator 47 should be adjusted to produce a change in the frequency of the variable frequency oscillator 53 of approximately 0.05% to 0.1% per pulse.

In order, therefore, to obtain the information from the instrument which gives the mass flow rate, a frequency-to-voltage converted and a voltmeter indicator is used. In order, therefore, to obtain the information from the instrument which gives the total mass transferred through the instrument a counting system is used to count the pulses which pass to the hysteresis brake coil 9. FIG. 11 illustrates such a system. The pulse rate passing to the coil 9 may be determined by connecting across the terminals of the coil 9 a frequency-to-voltage converter 57 such as is used in 38, FIG. 9, and measuring the output voltage by a voltmeter 58 as a measure of the pulse frequency and, therefore, of the pulse rate and thus of the mass flow rate of the fluid in the conduit. By integrating these pulses we may determine the total mass transferred per unit of time used in the integration. A conventional solenoid operated counter wheel 59 may be employed, the solenoid making one oscillation for each pulse and the indicator wheel keeping a record of each pulse for any desired period of time.

If it is desired to have an independent measure of the angular velocity of the fluid passing through the second rotor (blades 17), a voltage indicator 58' may be connected across the output of the frequency-to-voltage converter 38 of FIG. 9 (see FIG. 12) and the output voltage will be a measure of the pulse rate generated by the pulse generator 37 and, therefore, of the angular velocity of the fluid. In the system of FIG. 10, the same information (see FIG. 13) is obtainable by connecting the frequency-to-voltage converter 57' to the output of the pulse generator 37 and connecting the voltmeter 58" to the output of 57'.

While we have described particular embodiments of our invention for the purpose of illustration, it should be understood that various modifications and adaptations thereof may be made within the spirit of the invention as set forth in the appended claims.

We claim:

1. A mass flow meter transducer comprising a flow channel including an entrance port and an exit port, rotatable means in said channel rotated by the axial flow of said fluid to impose an angular velocity to said fluid, a hysteresis brake for said rotatable means, said hysteresis brake including an armature mechanically connected to said rotatable means and rotatable therewith, an electromagnet having a pair of magnet poles and a field coil, said armature rotatably positioned between said magnet poles to pass between said poles, means to pass a magnetizing current through said field coil whereby a braking torque is imposed on said rotatable means, means to sense the magnitude of said torque, means to generate a current responsive to said fluid angular velocity, means to pass said current to said field coil whereby a braking torque is imposed on said rotatable means, means for measuring said angular velocity of said fluid, and means responsive to said measuring means for adjusting said current to maintain said angular velocity of said fluid substantially constant.

2. In combination with mass flow meter transducer comprising a flow channel including an entrance port and an exit port, rotatable means in said channel rotated by the axial flow of said fluid to impose an angular velocity to said fluid, a hysteresis brake for said rotatable means, said hysteresis brake including an armature mechanically connected to said rotatable means and rotatable therewith, an electromagnet having a pair of magnet poles and a field coil, said armature rotatably positioned between said magnet poles to pass between said poles, a second rotatable means mounted in said channel for rotation at a rate responsive to said fluid angular velocity, means to generate a current at a frequency responsive to said rate of rotation of said second rotatable means, and means connected to said current generating means to generate an error signal whose magnitude is responsive to variations in said angular velocity, means to transform said error signal into a train of pulses each of said pulses of substantially like amplitude and width and at a frequency responsive to said error signal, and means to pass said pulses to said field coil to maintain the torque of said hysteresis brake responsive to said angular velocity whereby a braking torque is imposed on said rotatable means to maintain said angular velocity substantially constant.

3. In combination with the device of claim 2, in which said error signal is a voltage signal and in which said means for generating said train of pulses includes means for generating a train of substantially square waves at a frequency responsive to the magnitude of said error signal voltage, means to shape said square waves into a train of pulses of like amplitude and width.

4. A transducer for a mass flow meter comprising a flow channel including an entrance port and an exit port, rotatable means in said channel rotated by the axial flow of said fluid to impose an angular velocity to said fluid, a hysteresis brake for said rotatable means, said hysteresis brake including an armature mechanically connected to said rotatable means and rotatable therewith, an electromagnet having a pair of magnet poles and a field coil, said armature being rotatably positioned between said magnet poles to pass between said poles, means for passing a magnetizing current through said field coil whereby a braking torque is imposed on said rotatable means, means for measuring the magnitude of said angular velocity of said fluid, and means responsive to said measuring means for varying said magnetizing current to maintain said angular velocity of said fluid substantially constant.

5. A transducer as set forth in claim 4, and further including means for sensing the magnitude of said braking torque as a measure of mass flow.

6. A transducer as set forth in claim 4, wherein said rotatable means is a helical blade rotor, and said measuring means is a radial blade rotor.

7. A transducer as set forth in claim 6, and further including an electrical coil mounted adjacent to said radial blade rotor.

8. In the device of claim 7, the inductance of said coil being altered by the rotation of said rotor, and means to sense the rate of change of said inductance.

9. In the device of claim 8, said last named means comprising a pulse generator including said inductance to generate a train of pulses responsive to the rate of rotation of said rotor.

10. In the device of claim 9, said pulse generator including an electrical bridge of which said coil is one arm, an oscillator across the input of said bridge and a demodulator across the output of said bridge.

11. In combination with the device of claim 10, a frequency-to-voltage converter connected to said demodulator, a reference voltage source, means to connect the output of said frequency-to-voltage converter to a voltage sensing device and to said reference voltage source to generate an error voltage responsive to the difference in voltage between said converter output voltage and said reference voltage, a variable frequency oscillator whose frequency is responsive to the magnitude of said error voltage, a flip-flop connected to the output to said variable frequency oscillator, a saturable core transformer connected to said flip-flop, the output of said transformer connected to the core of said field coil.

12. In combination with the device of claim 10, a reference frequency oscillator, a gate circuit connected to said demodulator and to said reference frequency oscillator, an integrating capacitor connected to said gate circuit, a variable frequency oscillator connected to said capacitor, a flip-flop connected to said last named oscillator, a saturable core transformer connected to said flip-flop and to said coil of said field coil.

13. A mass flow meter transducer comprising a tubular member having an entrance and an exit port, a shaft positioned in said member, a first rotor including a hub rotatably positioned on said shaft adjacent said entrance port, a plurality of helical blades mounted on said hub, a magnetic shroud ring positioned on said helical blade rotor, an electromagnet, including a field coil and having a pair of poles, said shroud ring positioned between said poles, to pass between said poles, one pole positioned exteriorly of said shroud ring and the other pole positioned interiorly of said shroud ring, whereby, on rotation of said shroud ring between said poles on energizing of said coil, a braking torque is imposed on said first rotor, a second rotor positioned in said member including a hub mounted on said shaft for substantially unrestrained rotation and carrying a plurality of radial flat blades for measuring the angular velocity of said fluid issuing from said first rotor, whereby the angular velocity of said fluid as measured by said second rotor may be used to control said braking torque by the amount of energizing current applied to said coil to maintain said angular velocity of said fluid substantially constant, a coil mounted in said member adjacent to said radial rotor, and an electrical connection to said coils.

14. A mass flow meter transducer as set forth in claim 13, and further including means for indicating the magnitude of the braking torque.

15. In the device of claim 13, the inductance of said last named coil being altered by the rotation of said radial rotor, and means to sense the rate of change of said inductance.

16. In the device of claim 15, said last named means comprising a pulse generator including said inductance to generate a train of pulses responsive to the rate of rotation of said radial rotor.

17. In the device of claim 16, said pulse generator including an electrical bridge of which said last named coil is one arm, an oscillator across the input of said bridge and a demodulator across the output of said bridge.

18. In combination with the device of claim 17, a frequency-to-voltage converter connected to said demodulator, a reference voltage source, means to connect the output of said frequency-to-voltage converter to a voltage sensing device and to said reference voltage source to generate an error voltage responsive to the difference in voltage between said converter output voltage and said reference voltage, a variable frequency oscillator whose frequency is responsive to the magnitude of said error voltage, a flip-flop connected to the output to said variable frequency oscillator, a saturable core transformer connected to said flip-flop, the output of said transformer connected to the core of said field coil.

19. In combination with the device of claim 17, a reference frequency oscillator, a gate circuit connected to said demodulator and to said reference frequency oscillator, an integrating capacitor connected to said gate circuit, a variable frequency oscillator connected to said capacitor, a flip-flop connected to said last named oscillator, a saturable core transformer connected to said flip-flop and to said core of said field coil.

20. A mass flow meter transducer comprising a tubular member having an entrance and an exit port, a shaft positioned in said member, a first rotor including a hub rotatably positioned on said shaft adjacent said entrance port, a plurality of helical blades mounted on said hub, a magnetic shroud ring positioned on said helical blade rotor, an electromagnet, including a field coil and having a pair of poles, said shroud ring positioned between said poles to pass between said poles, one pole positioned exteriorly of said shroud ring and the other pole positioned interiorly of said shroud ring, whereby, on rotation of said shroud ring between said poles on energizing of said coil, a braking torque is imposed on said first rotor, a second rotor including a hub rotatably mounted on said shaft, a plurality of radial flat blades mounted on said hub, a coil mounted in said member adjacent to said radial rotor, and an electrical connection to said coils; means electrically connected to said electrical connections and responsive to the rate of rotation of said radial blade rotor to adjust the current to said field coil to maintain the rotation of said radial rotor substantially constant.

21. A mass flow meter transducer comprising a tubular member having an entrance and an exit port, a shaft positioned in said member, a first rotor including a hub rotatably positioned on said shaft adjacent said entrance port, a plurality of helical blades mounted on said hub, a magnetic shroud ring positioned on said helical blade rotor, an electromagnet, including a field coil and having a pair of poles, said shroud ring positioned between said poles, to pass between said poles, one pole positioned exteriorly of said shroud ring and the other pole positioned interiorly of said shroud ring, whereby, on rotation of said shroud ring between said poles on energizing of said coil, a braking torque is imposed on said first rotor; a second rotor including a hub rotatably mounted on said shaft, a plurality of radial flat blades mounted on said hub, a coil mounted in said member adjacent to said radial rotor, and an electrical connection to said coils, means for indicating the magnitude of the braking torque, and means electrically connected to said electrical connections to adjust the current passing through said field coil to maintain the rotation of the radial blade rotor substantially constant.

22. A mass flow meter transducer comprising a tubular member having an entrance and an exit port, a shaft positioned in said member, a first rotor including a hub rotatably positioned on said shaft adjacent said entrance port, a plurality of helical blades mounted on said hub, a magnetic shroud ring positioned on said helical blade rotor, an electromagnet, including a field coil and having a pair of poles, said shroud ring positioned between said poles, to pass between said poles, one pole positioned exteriorly of said shroud ring and the other pole positioned interiorly of said shroud ring, whereby, on rotation of said shroud ring between said poles on energizing of said coil, a braking torque is imposed on said first rotor; a second rotor including a hub rotatably mounted on said shaft, a plurality of radial flat blades mounted on said hub, a coil mounted in said member adjacent to said radial rotor, and an electrical connection to said coils, means for indicating the magnitude of the braking torque, and means electrically connected to said electrical connections to generate pulses at a frequency responsive to the rate of rotation of said second rotor and means to integrate said pulses and means responsive to said integral of said pulses to adjust the current passing to said electromagnet to maintain the rate of rotation of said second rotor substantially constant.

References Cited in the file of this patent

UNITED STATES PATENTS

| | | |
|---|---|---|
| 1,227,185 | Neuland | May 22, 1917 |
| 2,119,819 | List | June 7, 1938 |
| 2,709,755 | Potter | May 31, 1955 |
| 2,714,310 | Jennings | Aug. 2, 1955 |
| 2,800,794 | Meneghelli | July 30, 1957 |
| 2,832,218 | White | Apr. 29, 1958 |
| 2,857,761 | Bodge | Oct. 28, 1958 |
| 2,882,727 | Newbold | Apr. 21, 1959 |

FOREIGN PATENTS

| | | |
|---|---|---|
| 744,852 | Great Britain | Feb. 15, 1956 |
| 746,190 | Great Britain | Mar. 14, 1956 |

OTHER REFERENCES

Pages 32–34, text book "Principles of Aerodynamics" by Dwinnel, published 1949, by McGraw-Hill Co. (Copy available in Division 36.)